US008397281B2

(12) United States Patent
Pei et al.

(10) Patent No.: US 8,397,281 B2
(45) Date of Patent: Mar. 12, 2013

(54) SERVICE ASSISTED SECRET PROVISIONING

(75) Inventors: Mingliang Pei, Palo Alto, CA (US); Slawek Ligier, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 513 days.

(21) Appl. No.: 12/650,158

(22) Filed: Dec. 30, 2009

(65) Prior Publication Data

US 2011/0162053 A1 Jun. 30, 2011

(51) Int. Cl.
*G06F 7/04* (2006.01)
*G06F 15/16* (2006.01)
*H04L 29/06* (2006.01)
*G06F 17/30* (2006.01)

(52) U.S. Cl. ............... 726/6; 726/9; 726/10; 726/20; 380/279; 380/286

(58) Field of Classification Search ............... 726/6, 9, 726/10, 20; 380/279, 286
See application file for complete search history.

(56) References Cited

U.S. PATENT DOCUMENTS

| 5,481,613 | A * | 1/1996 | Ford et al. ................ 380/30 |
| 5,657,388 | A * | 8/1997 | Weiss ..................... 713/185 |
| 7,155,739 | B2 | 12/2006 | Bari et al. |
| 2001/0053226 | A1 * | 12/2001 | Akins et al. .............. 380/282 |
| 2005/0138389 | A1 | 6/2005 | Catherman et al. |
| 2006/0077034 | A1 * | 4/2006 | Hillier .................... 340/5.61 |
| 2007/0083917 | A1 | 4/2007 | Peterson et al. |
| 2007/0192829 | A1 | 8/2007 | Ford |
| 2008/0123843 | A1 | 5/2008 | Machani |
| 2008/0165967 | A1 | 7/2008 | Ross et al. |
| 2008/0208753 | A1 * | 8/2008 | Lee et al. .................. 705/51 |
| 2010/0153708 | A1 * | 6/2010 | Malka ...................... 713/155 |

FOREIGN PATENT DOCUMENTS

| CA | 2553081 A1 | 7/2006 |
| WO | WO 2005/083610 A1 | 9/2005 |
| WO | WO 2007/106566 A2 | 9/2007 |
| WO | WO 2008/033590 A2 | 3/2008 |

OTHER PUBLICATIONS

Lim, Chae Hoon and Taekyoung Kwon. "Strong and Robust RFID Authentication Enabling Perfect Ownership Transfer", 2006.*
Menezes, Alfred J. et al. Handbook of Applied Cryptography, 1997 CRC Press, LLC, p. 547.*
Schneier, Bruce. Applied Cryptography, Second Edition, 1996 John Wiley & Sons, Inc., pp. 176-177.*
Weiss, Kenneth P. "When A Password is Not a Password", 1990.*

(Continued)

*Primary Examiner* — Michael Simitoski
(74) *Attorney, Agent, or Firm* — Lowenstein Sandler LLP

(57) ABSTRACT

A method for providing a secret that is provisioned to a first device to a second device includes generating a One-Time Password at the first device using the secret and obtaining an identifier of the secret. The method also includes providing the One-Time Password and the identifier to the second device and sending the One-Time Password and the identifier to a remote provisioning service. The method also includes verifying that the One-Time Password corresponds to the secret, and sending to the second device an encrypted secret and a decryption key for decrypting the encrypted secret. The encrypted secret and the decryption key may be sent using different communications methods. The method also includes decrypting the encrypted secret using the decryption key to provide the secret and storing the secret at the second device.

19 Claims, 5 Drawing Sheets

OTHER PUBLICATIONS

Hoyer et al.,"Portable Symmetric Key Container draft-hoyer-keyprov-portable-symmetric-key-container-02.txt;" Network Working Group, Jul. 9, 2007, p. 1-51, http://tools.ietf.org/html/draft-hoyer-keyprov-portable-symmetric-key-container-02, Copyright, The IETF Trust 2007.

* cited by examiner

SERVICE ASSISTED SECRET PROVISIONING

FIELD OF THE INVENTION

The present invention relates generally to service assisted secret provisioning. The secrets may be used as a basis for generating credentials such as One-Time Passwords. More particularly, the present invention relates to methods and apparatus for provisioning a device with a secret where the secret is provisioned to another device.

BACKGROUND

A common step in deciding whether to grant a request for access to data or services in a network is to authenticate the requesting user. Authentication is the process of establishing or confirming one or more characteristics associated with a user or a request. For example, authentication may include confirming a user's identity or confirming that a request is generated by a particular device. In computer networks, authentication commonly involves the use of passwords. Knowledge of a password is assumed to warrant that the user is authentic. Typically, a user is assigned or selects a password, and upon each subsequent use the user must provide the password. A password is considered a first authentication factor because it is something the user knows that presumably no other user knows.

Since passwords are vulnerable to hackers, security can be improved by adding a second authentication factor. Second authentication factors generally include something the user has (as opposed to something the user knows). Second authentication factors preferably include credentials that can be generated systematically and verified efficiently. Common sources of second authentication factors include smart cards, tokens, and other similar security devices that may be referred to generally as security tokens.

A security token can include one or more secrets that may be shared with an authentication service. The token can use the secret as the basis for generating credentials such as One-Time Passwords (OTPs). An OTP can be a number or alphanumeric string that is generated once and is not reused. The token can generate an OTP and the user can send the OTP to an authentication service along with a unique serial number associated with the secret. The authentication service can generate an OTP using its copy of the secret associated with the serial number. The user is authenticated if the OTP determined by the authentication service matches the OTP provided by the user.

Secrets can be stored in numerous different types of devices and used as the basis for generating credentials. As examples, secrets may be stored in cell phones, personal digital assistants, notebook or laptop computers, personal computers, and other devices. Using the secrets, these devices can generate credentials that may be used, for example, to log in to various Internet services or to conduct on-line transactions.

When a user obtains a new device, such as a new cell phone, a new secret is typically obtained because security could be compromised if multiple devices shared the same secret. To prevent this, secrets are typically unique and are stored using tamper-resistant measures to prevent unauthorized disclosure or duplication. The new secret, however, has to be registered before it can be used to access data or services that were accessed using credentials generated with the old secret. Registering the new secret may include providing information to authenticate the user and providing information associated with the new secret. Registration may be required at each application where the credentials generated from the old secret were used. A token can be used in multiple customer web sites. Thus, a significant amount of time and effort may be required to register a secret before a new device can be used in the same manner as an old device to generate credentials and access data or services.

Thus, there is a general need in the art for improved methods and apparatus for provisioning devices with secrets.

SUMMARY

Embodiments of the present invention provide improved methods and apparatus for provisioning devices with secrets. Merely by way of example, some embodiments provide methods of provisioning a device with a secret where the secret is provisioned to another device. As an example, some embodiments provide methods of provisioning a device with the same secret that is provisioned to another device. As another example, some embodiments provide methods of provisioning a device with a new secret that is different from an old secret. As explained more fully below, these embodiments enable a user to obtain and use a new device with a new secret without having to register the new secret with each application where an old secret was used.

According to an embodiment of the present invention, a method for providing a secret that is provisioned to a first device and used as a basis for generating One-Time Passwords to a second device includes generating a One-Time Password at the first device using the secret and obtaining an identifier of the secret. The method also includes providing the One-Time Password and the identifier to the second device and sending the One-Time Password and the identifier to a remote provisioning service. The method also includes verifying that the One-Time Password corresponds to the secret and sending an encrypted secret and a decryption key to the second device. The encrypted secret and the decryption key may be sent using different communications methods. The method also includes decrypting the encrypted secret using the decryption key to provide the secret and storing the secret at the second device.

According to another embodiment of the present invention, a method for providing a secret that is associated with a first device and used as a basis for generating credentials to a second device includes obtaining a credential generated at the first device and an identifier associated with the secret. The method also includes sending the credential and the identifier to the remote provisioning service. The method also includes receiving the secret from the remote provisioning service and storing the secret at the second device.

According to yet another embodiment of the present invention, a method for providing a secret that is associated with a first device and used as a basis for generating credentials to a second device using a remote provisioning service includes receiving a credential generated at the first device and an identifier associated with the secret at the remote provisioning service. The method also includes verifying that the credential corresponds to the secret and sending the secret from the remote provisioning service to the second device.

According to yet another embodiment of the present invention, an apparatus configured to provide a secret used as a basis for generating credentials to a device includes a receiving mechanism configured to receive a credential generated at a first device using a first secret and to receive an identifier associated with the first secret. The apparatus also includes a verifying mechanism configured to verify that the credential corresponds to the identifier of the first secret and a sending mechanism configured to send a second secret to the second device.

Numerous benefits are achieved by way of the present invention over conventional techniques. For example, some embodiments of the present invention provide methods of provisioning a device with a secret where the secret is provisioned to another device. A credential generated using a secret on an old device and an identifier of the secret may be sent from a new device to a provisioning service. If the credential corresponds to the identifier, the secret may be sent from the provisioning service to the new device. Alternatively, a new secret may be sent to the new device. These embodiments provide secure methods of provisioning a new device with a secret that is provisioned to an old device. These embodiments also enable a user to obtain and use a new device without having to register a new secret with each application where an old secret was used.

Depending upon the embodiment, one or more of these benefits may exist. These and other benefits are described throughout the specification and more particularly below.

DETAILED DESCRIPTION

Embodiments of the present invention provide secure and user friendly methods of provisioning a device with a secret where the secret is provisioned to another device. Such embodiments may be used, for example, when a user obtains a new device. As an example, a user may have a device, such as a cell phone, with a secret that is used to generate credentials, such as One-Time Passwords (OTPs). The user may use the cell phone to generate OTPs that are used to access data and services. When the user obtains a new cell phone, some embodiments of the present invention can be used to provision the new cell phone with the same secret that is provisioned to the old cell phone. Alternatively, other embodiments can be used to provision the new cell phone with a new secret. In either case, embodiments can be used that are secure and that require minimal time and effort to be able to use the new cell phone with each application where the old cell phone was used.

Figure 1:
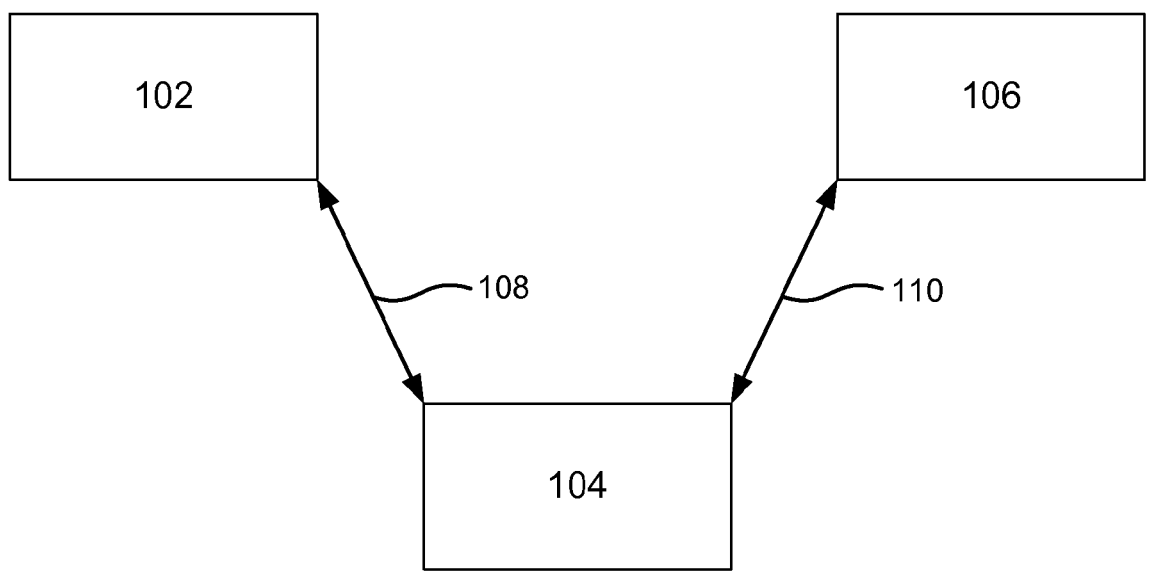
FIG. 1 is a simplified diagram of a system for provisioning a device with a secret according to an embodiment of the present invention.

FIG. 1 is a simplified diagram of a system for provisioning a device with a secret according to an embodiment of the present invention. As used herein, a secret may refer to a secret, an algorithm that can be used with a secret, or a secret and algorithm used together to generate credentials such as OTPs. An OTP may include a response for a challenge if a challenge-response algorithm is used. The exemplary system illustrated in FIG. 1 includes a first device 102, a second device 104, and a provisioning service 106. Device 102 can be any digital device, e.g. a mobile phone, a security token, a smartcard, a personal digital assistant, a notebook or laptop computer, a personal computer, an Internet appliance, or a similar device that includes a secret. Device 104 can be any network accessible device, e.g. a mobile phone, a smartcard, a personal digital assistant, a notebook or laptop computer, a personal computer, an Internet appliance, or a similar device. The devices 102, 104 may include typical software and hardware components as would be understood by one of ordinary skill in the art. For example, the devices 102, 104 may include visual displays with means for user input in accordance with known techniques.

In an embodiment, the devices 102, 104 each include a memory and a central processing unit (CPU). The memory may be configured to store the information and instructions that can be executed by the CPU to perform at least part of the methods in accordance with embodiments of the present invention. As an example, the memory of the second device 104 may include provisioning software with instructions for sending data to the provisioning service 106. The memory is not limited and may include magnetic storage media, optical storage media, flash memory, and the like. Similarly, the CPUs are not limited and may include general purpose microprocessors configured to execute instructions or Application Specific Integrated Circuits (ASICs) that embody at least a part of the instructions in software, firmware and/or hardware. One of ordinary skill in the art would recognize many variations, modifications, and alternatives.

The provisioning service 106 typically includes one or more computers and/or servers capable of communicating with at least the second device 104 and configured to carry out the steps described below to provision the second device 104 with a secret. The computer(s) and/or server(s) may include typical hardware and software configurations as would be understood by one of ordinary skill in the art.

In an embodiment, each of the computer(s) and/or server(s) may include a memory and one or more CPUs. The memory may be configured to store the information and instructions that can be executed by the CPU(s) to perform at least part of the methods in accordance with embodiments of the present invention. As an example, the memory may include provisioning software with instructions for provisioning the second device 104 with a secret. The memory may be local or remote and may include magnetic storage media, optical storage media, flash memory, and the like. Similarly, the CPU(s) is not limited and may include a general purpose microprocessor configured to execute instructions and/or an ASIC that embodies at least a part of the instructions in software, firmware and/or hardware. One of ordinary skill in the art would recognize many variations, modifications, and alternatives.

Although specific aspects and features of the devices 102, 104 and the provisioning service 106 have been described, one of ordinary skill in the art will appreciate that devices and a provisioning service suitable for use with methods and apparatus consistent with the present invention may contain additional and/or different hardware and software. Thus, the devices 102, 104 and the provisioning service 106 are not limited to the exemplary aspects and features described above.

The first device 102 and the second device 104 may be configured to communicate via a communications link 108. In an embodiment, the first device 102 is configured to provide credentials and an identifier of the secret stored on the first device 102 to the second device 104. The communications link 108 between the devices 102, 104 may be any link, such as a wired link or a wireless link over any network such as a radio network. Alternatively, the communications link 108 may be a direct communications link using, for example, IR or Bluetooth technologies. In another embodiment, the communications link 108 may include a user obtaining one or more credentials and an identifier of the secret stored from the first device 102 and inputting the credentials and identifier to the second device 104 in accordance with known techniques.

The second device 104 and the provisioning service 106 may be configured to communicate via a communications link 110. The communications link 110 between the second device 104 and the provisioning service 106 may be any link, such as a wireless link, a wired link, or a link over a network such as a radio network (e.g., a cellular network) or a computer network (e.g., the Internet). Communications over the Internet may use an encrypted connection such as Secure Sockets Layer (SSL) or Transport Layer Security (TLS). The communications link 110 is not limited to these particular communications technologies, however, and one of ordinary skill in the art will appreciate that various aspects of the invention may be practiced utilizing these and other communications technologies in accordance with known techniques.

Figure 2:
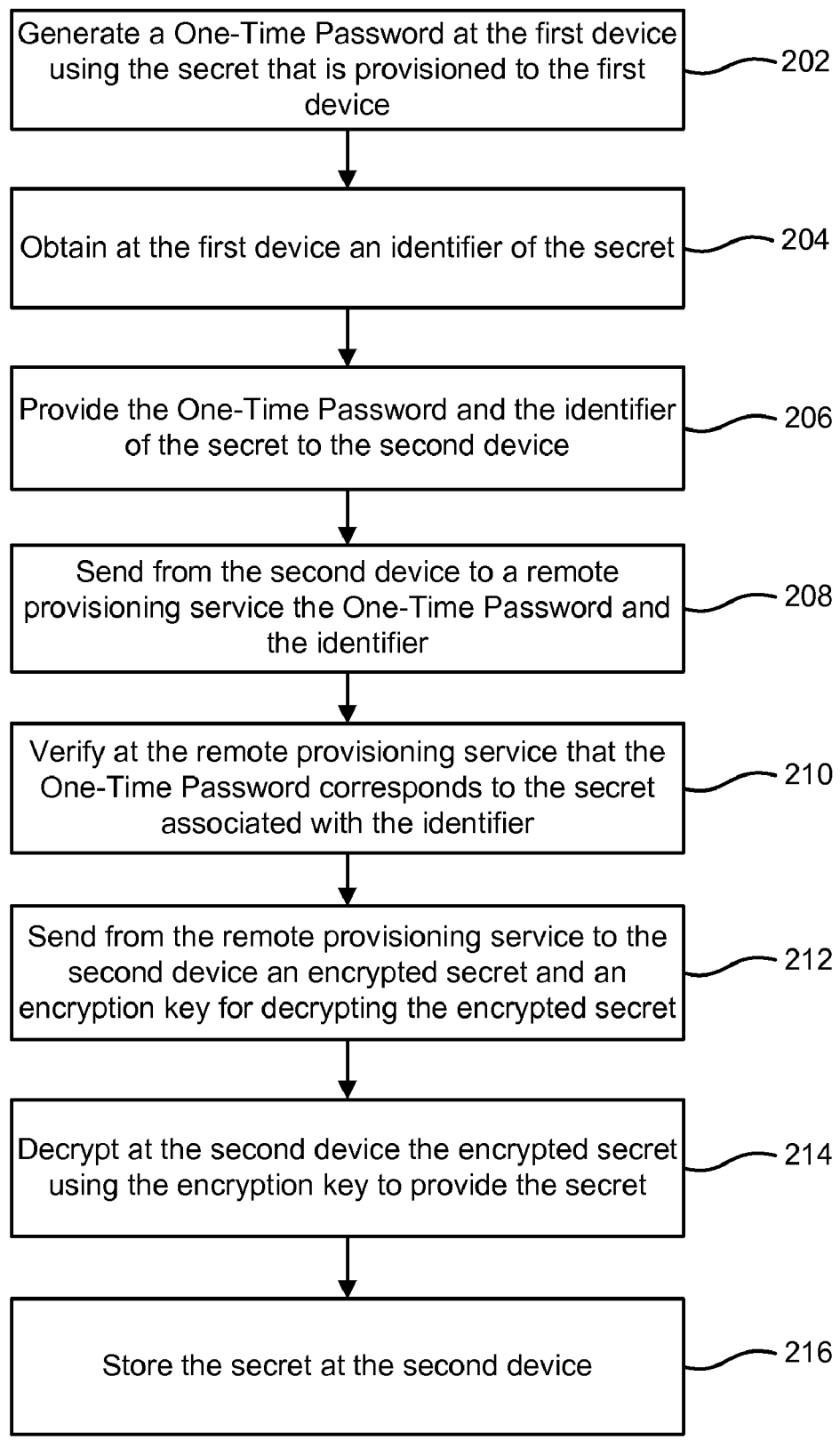
FIG. 2 is a simplified flowchart illustrating an exemplary method of provisioning a device with a secret where the secret is provisioned to another device in accordance with an embodiment of the invention.

FIG. 2 is a simplified flowchart illustrating an exemplary method of provisioning a device with a secret where the secret is provisioned to another device in accordance with an embodiment of the invention. The method is described below with reference to the exemplary system illustrated in FIG. 1. The method includes generating an OTP at a first device 102 using the secret that is provisioned to the first device 102 (202). A user may use the first device 102 to generate the OTP in accordance with known techniques. For example, a credential application may be embodied in software and stored in memory of the first device 102. The credential application may include instructions to generate a credential using the secret. The credential application may also include instructions to provide the credential to a visual display where it can be viewed by a user or to send the credential to another device via a communications link. The method also includes obtaining at the first device 102 an identifier of the secret (204). For example, the identifier of the secret may be provided by the credential application along with the OTP. The credential application may include instructions to provide the identifier to a visual display or to send the identifier to another device via a communications link.

The method also includes providing the OTP and the identifier of the secret to the second device 104 (206). In an embodiment, the OTP and the identifier may be sent from the first device 102 to the second device 104 using the communications link 108. In another embodiment, a user may obtain the OTP and the identifier from the first device 102, for example from a visual display of the first device 102, and provide or input the OTP and the identifier to the second device 104.

The method also includes sending from the second device 104 to a remote provisioning service 106 the OTP and the identifier (208). The OTP may include algorithm related attributes such as a challenge value used with the secret to generate the OTP. The OTP and the identifier may be sent using communications link 110. The OTP and the identifier may be sent via a voice or data connection over a cellular network, or via a data connection over a computer network. For example, in an embodiment the OTP and the identifier are sent over the Internet using a file transfer protocol such as the HyperText Transfer Protocol (HTTP) and an encrypted connection such as SSL or TLS. One of ordinary skill in the art would recognize many variations, modifications, and alternatives.

In one embodiment the second device 104 includes a provisioning application that may be embodied in software and stored in memory of the second device 104. The provisioning application may include instructions to receive the OTP and the identifier in step 206 and to send the OTP and the identifier in step 208 to the remote provisioning service 106.

The method also includes verifying at the remote provisioning service 106 that the OTP corresponds to the secret associated with the identifier (210). The remote provisioning service 106 may confirm that an OTP generated using its copy of the secret corresponds to the OPT sent from the second device 106.

The method also includes sending from the remote provisioning service 106 to the second device 104 an encrypted secret and a decryption key for decrypting the encrypted secret (212). The secret is encrypted for reasons of end-to-end security. Any type of encryption, including symmetric or asymmetric encryption, may be used. The encryption may rely on the underlying encrypted connection such as SSL or TLS. In some embodiments, the encrypted secret and the decryption key are sent using different communications methods. For example, in an embodiment the encrypted secret may be sent over a computer network such as the Internet using HTTP and an encrypted connection such as SSL or TLS. The decryption key may be sent via a different communications method, for example using a Short Message Service (SMS) message over a cellular network. In this example, the SMS message may be considered to be an out-of-band communications method because it is different from the communications method used to send the secret.

The method may also include decrypting at the second device the encrypted secret using the decryption key to provide the secret (214). This step may be required if additional encryption is used beyond the encrypted connection (e.g., SSL or TLS). The decryption key may be the same as, or different than, the encryption key. For example, the encryption and decryption keys can be the same if a symmetric cryptographic algorithm is used to encrypt the secret, such as the Password-Based-Encryption (PBE) or AES algorithms. The decryption key may be different than the encryption key if an asymmetric cryptographic algorithm is used to encrypt the secret, such as RSA or a public key ECC algorithm. The encrypted secret may be decrypted in accordance with known techniques. The method also includes storing the secret at the second device (216). The secret may be stored in a secure fashion using, for example, tamper-resistant software or hardware protection in accordance with known techniques. In an embodiment, the provisioning application stored in memory of the second device 104 includes instructions for receiving the encrypted secret, instructions for decrypting the encrypted secret, and instructions for storing the secret at the second device 104.

The method illustrated in FIG. 2 is secure because it requires authentication using the OTP and the identifier from the first device 102. Providing the OTP and the identifier to the remote provisioning service 106 authenticates that a user is in possession of both the first device 102 and the second device 104. In some embodiments, the OTP may include more than one OTP to further increase security. Also, an encrypted secret and a decryption key may be sent from the remote provisioning service 106 to the second device 104 using different communications methods. Further, some embodiments may include deleting the secret from the first device 102 so that the same secret is not shared by multiple devices.

Figure 3:
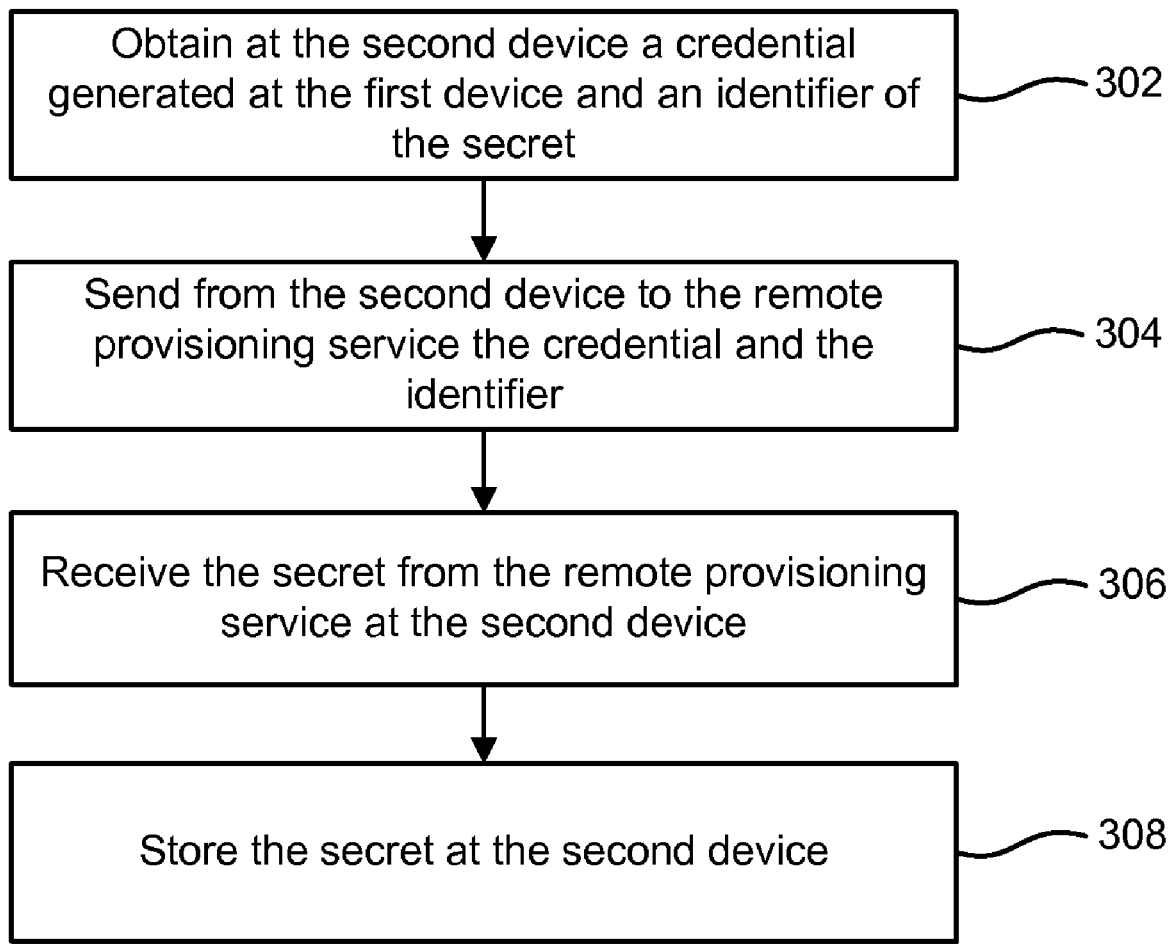
FIG. 3 is a simplified flowchart illustrating an exemplary method of obtaining a secret from a provisioning service in accordance with another embodiment of the invention.

FIG. 3 is a simplified flowchart illustrating an exemplary method of obtaining a secret from a provisioning service in accordance with another embodiment of the invention. The method includes obtaining at the second device 104 a credential generated at the first device 102 and an identifier of the secret (302). The credential may include one or more credentials or OTPs. As an example, in an embodiment the credential includes two OTPs to improve security against hacking. In another embodiment, the credential includes a challenge provided to the first device 102 and a response generated by the first device 102 using the secret. For example, the challenge may be provided by a user or by the remote provisioning service 106, and the response may be generated based on the challenge.

In some embodiments the credential is generated at the first device 102 using the secret. In other embodiments the credential is generated at the first device 102 using a provisioning secret that is different from the secret. A provisioning secret may be a secret that is used for authentication when provisioning a device. For example, when a user obtains a new device and wants to provision the new device with a secret that is provisioned to an old device. In an embodiment, the provisioning secret may be associated with the same identifier as the secret.

The method also includes sending from the second device 104 to the remote provisioning service 106 the credential and the identifier (304). The credential and the identifier may be sent using communications link 110. The method also includes receiving the secret from the remote provisioning service 106 at the second device 104 (306). The secret is sent to the second device 104 if the credential corresponds to the identifier. The secret may be received using communications link 110. In some embodiments, the secret may be encrypted in accordance with known techniques. An encryption or decryption key may also be sent from the remote provisioning service 106 to the second device 104 using a different communications medium as explained above with regard to step 212 of FIG. 2.

The method also includes storing the secret at the second device 104 (308). The secret may be securely stored as explained previously.

Figure 4:
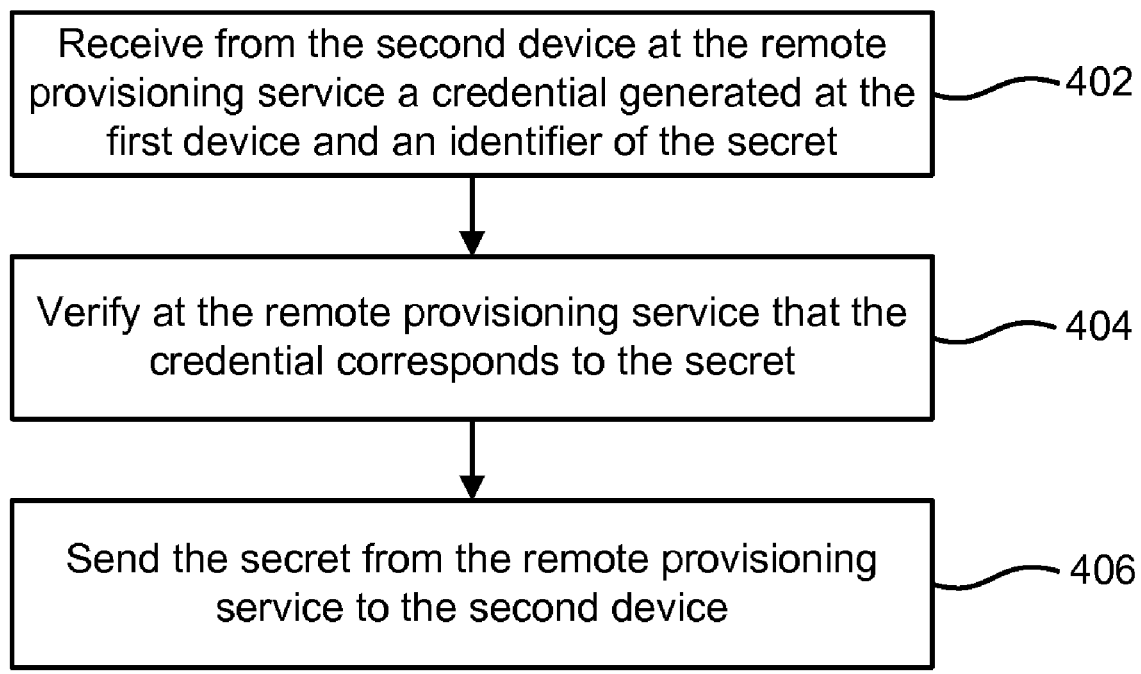
FIG. 4 is a simplified flowchart illustrating an exemplary method of provisioning a device with a secret where the secret is provisioned to another device in accordance with another embodiment of the invention.

FIG. 4 is a simplified flowchart illustrating an exemplary method of provisioning a device with a secret where the secret is provisioned to another device in accordance with another embodiment of the invention. The method includes receiving from the second device 104 at the remote provisioning service 106 a credential generated at the first device 102 and an identifier associated with the secret (402). The credential and the identifier may be received using communications link 110. Step 402 may be similar to step 302, and the credential may be generated at the first device 102 using the secret or a provisioning secret as explained previously.

The method also includes verifying at the remote provisioning service 106 that the credential corresponds to the secret (404). This may include generating a credential at the remote provisioning service 106 using its copy of the secret associated with the identifier. If the credential corresponds to the secret, the method also includes sending the secret from the remote provisioning service 106 to the second device 104 (406). The secret may be sent using communications link 110. The secret may be encrypted as explained previously. Also, a decryption key may be sent from the remote provisioning service 106 to the second device 104 using a different communications medium as explained above with regard to step 212 of FIG. 2. As described above, the decryption key may be the same as, or different than, the encryption key used to encrypt the secret. The decryption key may be used by the second device 104 to decrypt the secret.

Figure 5:
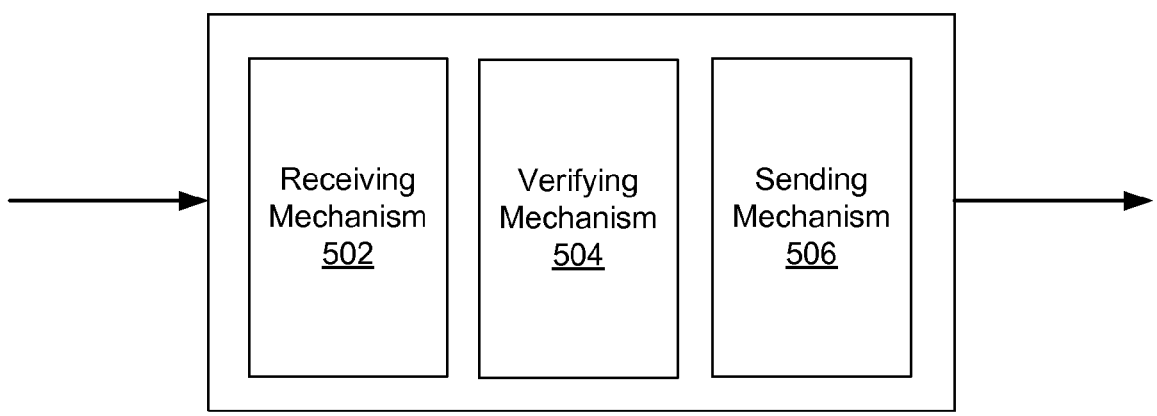
FIG. 5 is a simplified diagram of an exemplary apparatus for provisioning a device with a secret in accordance with an embodiment of the invention.

FIG. 5 is a simplified diagram of an exemplary apparatus for provisioning a device with a secret in accordance with an embodiment of the invention. The apparatus may be configured to implement the features of the remote provisioning service 106 described above. For example, the apparatus may include a receiving mechanism 502. The receiving mechanism 502 may be configured to receive a credential generated at a first device 102 using a first secret. The first secret may be a secret that is used to generate credentials to access data and services, or a provisioning secret that is used for authentication when provisioning a device. The receiving mechanism 502 may also be configured to receive an identifier associated with the first secret.

The apparatus may also include a verifying mechanism 504. The verifying mechanism 504 may be configured to verify that the credential corresponds to the first secret. This may include generating a credential at the remote provisioning service 106 using a copy of the secret associated with the identifier. The apparatus may also include a sending mechanism 506. The sending mechanism 506 may be configured to send a second secret from the remote provisioning service 106 to the second device 104. The sending mechanism 506 may be configured to encrypt the second secret prior to sending using known encryption techniques. The sending mechanism may also be configured to send a decryption key to the second device 104 using an out-of-band communications method. The decryption key may be used by the second device 104 to decrypt the second secret.

In an embodiment, the second secret is different from the first secret. For example, the second device 104 may be provisioned with a second secret that is different from the first secret provisioned to the first device 102. This can provide increased security because it ensures that multiple devices will not share the same secret. Further, if the remote provisioning service 106 is also the authentication service, the authentication service can make the necessary database updates so that the second secret does not have to be registered with each application where the first secret was used. For example, the user may be associated with the second secret in the authentication database.

While the present invention has been described in terms of specific embodiments, it should be apparent to those skilled in the art that the scope of the invention is not limited to the embodiments described herein. For example, it is to be understood that the features of one or more embodiments of this invention may be combined with one or more features of other embodiments of the invention without departing from the scope of the invention. Also, the examples and embodiments described herein are for illustrative purposes only, and various modifications or changes in light thereof will be evident to persons skilled in the art and are to be included within the spirit and purview of this application and the scope of the appended claims.

What is claimed is:

1. A non-transitory computer readable storage medium including instructions that, when executed by a processing device, cause the processing device to perform a method for providing a secret that is associated with a first device and used as a basis for generating credentials to a second device using a remote provisioning service, the method comprising:
obtaining at the second device a credential generated at the first device and an identifier associated with the secret;

wherein the credential generated at the first device comprises at least two One-Time Passwords generated using the secret;
sending from the second device to the remote provisioning service the credential and the identifier;
receiving the secret from the remote provisioning service at the second device; and
storing the secret at the second device.

2. A method for providing a secret that is associated with a first device and used as a basis for generating credentials to a second device using a remote provisioning service, the method comprising:
obtaining at the second device a credential generated at the first device and an identifier associated with the secret;
wherein the credential generated at the first device comprises at least two One-Time Passwords generated using the secret;
sending from the second device to the remote provisioning service the credential and the identifier;
receiving the secret from the remote provisioning service at the second device; and
storing the secret at the second device.

3. The method of claim 2 wherein the credential is generated at the first device using the secret.

4. The method of claim 2 wherein the credential is generated at the first device using a provisioning secret that is different from the secret.

5. The method of claim 4 wherein the provisioning secret and the secret are associated with the identifier.

6. The method of claim 2 wherein the credential sent from the second device to the remote provisioning service comprises a challenge provided to the first device and a response generated by the first device using the secret.

7. The method of claim 6 further comprising receiving from the remote provisioning service at the second device a decryption key for decrypting the encrypted secret, wherein the encrypted secret and the decryption key are received using different communications methods.

8. The method of claim 2 wherein the secret received from the remote provisioning service at the second device is an encrypted secret, and the method further comprises decrypting the encrypted secret at the second device.

9. A method for providing a secret that is associated with a first device and used as a basis for generating credentials to a second device using a remote provisioning service, the method comprising:
receiving from the second device at the remote provisioning service a credential generated at the first device and an identifier associated with the secret;
wherein the credential generated at the first device comprises at least two One-Time Passwords generated using the secret;
verifying at the remote provisioning service that the credential corresponds to the secret; and
sending the secret from the remote provisioning service to the second device.

10. The method of claim 9 wherein the credential is generated at the first device using the secret.

11. The method of claim 9 wherein the credential is generated at the first device using a provisioning secret that is different from the secret.

12. The method of claim 9 wherein the credential sent from the second device to the remote provisioning service comprises a challenge provided to the first device and a response generated by the first device using the secret.

13. The method of claim 9 wherein the secret sent from the remote provisioning service to the second device is an encrypted secret.

14. The method of claim 13 further comprising sending from the remote provisioning service to the second device a decryption key for decrypting the encrypted secret, wherein the encrypted secret and the decryption key are sent using different communications methods.

15. An apparatus comprising:
a memory to store instructions for generating credentials for a first device;
a processor, coupled to the memory, wherein the processor is configured to:
receive from a second device a credential generated at the first device using a first secret and to receive an identifier associated with the first secret,
wherein the credential generated at the first device comprises at least two One-Time Passwords generated using the first secret;
verify that the credential corresponds to the identifier of the first secret; and
send a second secret to the second device.

16. The apparatus of claim 15 wherein the first secret is different from the second secret.

17. The apparatus of claim 15 wherein the first secret is a provisioning secret.

18. The apparatus of claim 15 wherein the first secret is same as the second secret.

19. The apparatus of claim 15 wherein the second secret is an encrypted secret.

* * * * *